United States Patent [19]

Ronc

[11] 4,199,639
[45] Apr. 22, 1980

[54] SANDWICH-STRUCTURED DOUBLE LAYER FLOOR COVERING

[76] Inventor: Walter Ronc, Drisglerstrasse 43, 8107 Buchs,ZH, Switzerland

[21] Appl. No.: 923,386

[22] Filed: Jul. 10, 1978

[30] Foreign Application Priority Data

Jul. 25, 1977 [CH] Switzerland ............... 009256/77

[51] Int. Cl.² .......... B32B 3/10; B32B 5/00; D04H 1/04
[52] U.S. Cl. .............................. 428/138; 428/137; 428/296; 428/300; 428/315; 428/332; 428/333
[58] Field of Search ............ 428/137, 138, 102, 300, 428/315, 320, 317, 91, 85, 332, 333, 296

[56] References Cited

U.S. PATENT DOCUMENTS

| | | | |
|---|---|---|---|
| 3,360,421 | 12/1967 | Sands | 428/137 X |
| 3,567,565 | 3/1971 | Jones et al. | 428/102 |
| 3,616,138 | 10/1971 | Wentworth | 428/317 X |
| 3,635,786 | 1/1972 | Hughes | 428/102 |
| 3,649,427 | 3/1972 | Hughes | 428/102 |
| 3,755,062 | 8/1973 | Shirmer | 428/286 X |
| 3,759,742 | 9/1973 | Salamon et al. | 428/102 |
| 3,837,988 | 9/1974 | Hennen et al. | 428/286 X |
| 3,968,290 | 7/1976 | Dees, Jr. et al. | 428/286 |
| 3,975,562 | 8/1976 | Madebach et al. | 428/218 X |
| 3,994,759 | 11/1976 | Stoller | 428/288 X |
| 4,007,307 | 2/1977 | Friedrich | 428/315 X |

*Primary Examiner*—Lorraine T. Kendell
*Attorney, Agent, or Firm*—Herbert L. Lerner

[57] ABSTRACT

Sandwich-structured double layer floor covering with the upper surface layer of fleece made of synthetic polymer fiber of at least 5 mm thickness having, on the upper surface, needle work of with a minimum of 2 million stitches per square meter, and with a lower layer of cellular polyethylene having a maximum density of 35 kilograms per cubic meter and a thickness of at least 5 millimeters. The combination of the two different layers and needling make it particularly suitable as a floor covering for sports-grounds especially with regard to sliding friction on the top surface and the shock-absorption property of the lower layer.

7 Claims, 1 Drawing Figure

U.S. Patent
Apr. 22, 1980
4,199,639
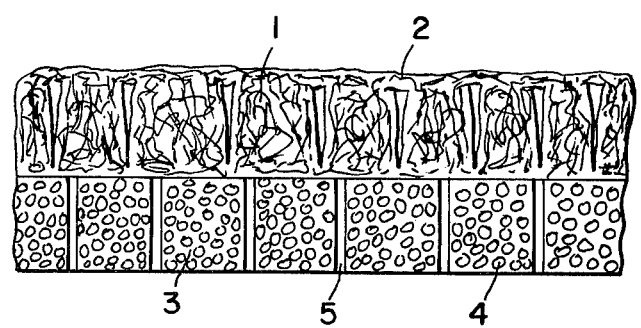

SANDWICH-STRUCTURED DOUBLE LAYER FLOOR COVERING

BACKGROUND OF THE INVENTION

1. Field of the Invention

This invention relates to a floor covering and more particularly refers to a new and improved multi-layer floor covering adapted for use in sporting arenas.

2. Description of the Prior Art

Today, various synthetic floor coverings, such as tartan etc., are used for the construction of sports-grounds. There is no doubt that these coverings for sports-grounds have become highly economical and their physical characteristics have often led to improved performances. Moreover, the coverings are relatively free from servicing, resistant to exposure and practically abrasion-proof. Synthetic floor coverings generally produce an elasticity without the effect of shock-absorption because they contain rubber scrap or synthetic granules (see e.g. Swiss Pat. Nos. 503 504, 547 915, 550 014 and 565 575). Therefore, in spite of various publications, the injurious effects to the health of performers due to the synthetic floor coverings could not be eliminated. These injurious effects, so called "synthetic surface syndromes", can cause damage due to overstrain as well as cause an increase in the risk of accident. Prof. Dr. med. L. Prokop of the Austrian Institute for Sports Medicine, Vienna, tates after a detailed research that "the use of synthetic tracks for training and contests will cause an increase of certain pathological effects". The research was made with more than 30 different synthetic floor coverings and, among others, included a study of the parameters relevant for the injurious effects to health. The result shows that an unilateral consideration of the rate of elasticity must lead to a false conclusion, since the elasticity can only be determined together with the rate of shock-absorption.

A decisive factor therefor is the strain on the foot in its function as a shock-absorber. On a non-elastic, hard floor the foot's function of shock-absorption is strained to a maximum, but even on an elastic floor the foot is still highly strained. This is due to the fact that the floor's elasticity catapults the developed forces from the floor back to the foot. At the same time, when treading on a synthetic floor covering, the foot develops natural vibrations of 80 to 100 C.P.S. which are to be absorbed by the foot and its muscles and sinews (see "Die Belastung des Bewegungsapparates auf Kunststoffböden" by Dr. med. B. Segesser of the Felix-Platter Hospital (Orthopedic University Clinic) Basel). In addition to the effect of shock-absorption—and not only because of its elasticity—the slide rate of the surface of a floor covering plays an important part with regard to the strain on the human locomotor system. A strong sliding friction, or a non-slip surface, blocks the free movement of the foot and increases the strain on the locomotor system, leading to sprains or rupture of the meniscus. For years, medical people connected with sports and, particularly, athletes have asked for a superior covering. However, until now an appropriate floor covering had not been produced.

The Laboratory for Biomechanics of the Swiss Technical Upper School (ETH), Zürich (Dr. B. Nigg), did research on various floor coverings with regard to the strain on the human locomotor system. Artificial coverings achieved the highest negative results, slightly higher than asphalt, 81% higher than lawn, and 40% higher than conventional cinder-track.

SUMMARY OF THE INVENTION

An object of the invention is to provide a floor covering, particularly for sporting purposes, which is simple to manufacture, economical to install and maintain, but avoids the hereinafore-mentioned disadvantages of synthetic floor coverings.

With the foregoing and other objects in view, there is provided in accordance with the invention, a sandwich-structured double layer floor covering having an upper surface layer of fleece, at least 5 millimeters thick, made of synthetic polymer with a minimum needling on the upper surface of 2 million stitches per square meter; and a lower layer of cellular polyethylene having a maximum density of 35 kilograms per cubic meter and a thickness of at least 5 millimeters.

Other features which are considered as characteristic for the invention are set forth in the appended claims.

Although the invention is illustrated and described herein as embodied in sandwich-structured double layer floor covering, it is nevertheless not intended to be limited to the details shown, since various modifications may be made therein without departing from the spirit of the invention and within the scope and range of equivalents of the claims.

BRIEF DESCRIPTION OF THE DRAWING

The FIGURE represents a section of the sandwich-structured double layer floor covering with an upper layer of fleece having needlework, and a lower layer of cellular polyethylene having closed cells, the layers hot welded without adhesive.

DETAILED DESCRIPTION OF THE INVENTION

The sandwich-structured double layer floor covering is a combination of a lower layer of aerated, interlaced polyethylene foam plastic or cellular polyethylene with a maximal specific gravity of 35 kgs/m$^3$, and an upper surface layer of a fleece made of synthetic high polymer fiber with needle work of 2 million stitches per m$^2$. The upper surface layer and the lower layer each have a minimum thickness of 5 millimeters. In the production of the sandwich-structured double layer floor covering, the two layers each on a roll are connected by the use of hot welding. The method of hot welding is a known procedure normally used for laminating plastic materials. Hot welding the two layers of the floor covering results in a considerable higher durability and resistance to atmospheric corrosion as compared to using adhesives for connecting the two layers. Also the use of adhesives hardens the textile material which results in a reduced durability. In addition, the installation of the floor covering in rolls or in plates reduces the work load in comparison to the installation with partly liquid material (see e.g. Swiss Pat. No. 565 575).

Referring to the diagrammatic drawing of a section of the sandwich-structured double layer floor covering, the surface layer 1 is a textile material in the form of fleece made of synthetic high polymer fibers, and preferably consists of a fleece of synthetic polypropylene fibers. Such fleeces of synthetic polymer fiber are known in the industry. The surface of the textile material has needlework 2 of at least 2 million stitches per m$^2$. Depending on the type of sport, the needlework can consist of 2 to 3.5 million stitches per m², e.g. for tennis courts needlework of 3 million stitches is considered ideal. The surface layer is permeable and resistant to exposure and atmospheric corrosion. Polyester and polyamide may also be used. The lower layer is a cellular polyethylene often called "foam" and may be produced by incorporating gas or hollow pockets in the polyethylene, by aerating or by blowing agents, to form a foam or cellular polyethylene. Such foam or cellular polyethylene is commercially manufactured and its density controlled, at least in part, by the volume of cells of hollow pockets, Generally the structure is of the closed cell type making it impermeable.

The fleece 1 is now connected by hot welding but without any adhesives or any intermediate layer with an aerated polyethylene foam plastic 3, containing inflated hollows or air or gas spaces 4. Combining the layers 1 and 3 by making use of the above described procedure, a synergistic effect is achieved with regard to the quality of the compound material.

The floor covering of the invention permits, even when wet, a high stepping safety rate but at the same time reduces the sliding friction because of the high needling and the shock absorbing effect of the cellular lower layer. In contradistinction to the existing floor coverings, the air or gas enclosed in the cells of the lower layer effects an excellent shock-absorption of the bouncing foot similar to that found on a natural ground such as lawn or sand. An especially important factor is that the human locomotor system will not be overstrained by the catapult effect of the rebound. Moreover, thanks to the strain-absorbing lower layer, the surface layer becomes highly abrasion-proof.

Although the most favorable results with the sandwich-structured double layer floor covering have been achieved with a thickness of 5.5 millimeters for the lower layer and 6 millimeters for the upper surface layer, a greater thickness of up to 10 millimeters or more for each layer may be employed.

To obtain the best possible shock-absorption without producing any negative side effects, the lower layer should preferably have a specific gravity or density of 30 kgs/m³. An example of such polyethylene plastic foam is "Trocellen", produced by Dynamit Nobel Corporation. Cellular polyethylenes having a density below about 25 kgs/m³ have much poorer shock-absorption properties.

To use this floor covering for outdoor sportsgrounds, permeability of the covering is highly desirable. Since the polyethylene foam plastic is waterproof, perforations 5 were formed in the polyethylene foam plastic 3 thereby making it permeable. Excellent results have been achieved with perforations having a hole diameter of 4 to 5 millimeters and a distance between the holes of 20 to 30 millimeters.

Permeability is another advantage in using hot welding in comparison to adhesives. Adhesion is not dependent on the relation between agglutinated areas and unconnected areas (as described e.g. in Swiss Pat. No. 550 014). With adhesives there is a demand for large agglutinated areas to obtain good adhesion and this is diametrically opposed to the demand for as little agglutination as possible to obtain the required permeability.

Permeability is an important factor concerning the usefulness of the ground after rain, it being of great importance e.g. for tennis courts. For this reason, various tests have been made by putting the double layer floor covering of the present invention on different substructure materials such as porous and smooth concrete and even asphalt and cement bricks. All these tests have proven the usefulness of the covering even after rain and showed excellent permeability without material loss of desirable properties.

The shock-absorption effect of the floor covering of the present invention because of its high sliding safety rate adapts it for use in school- and public-buildings as well as for construction of pavements and roadways. The covering also has excellent characteristics with regard to sound- and heat-insulation and lends itself to such use.

I claim:

1. Sandwich-structured double layer floor covering composed of A) an upper surface layer of fleece at least 5 millimeters thick made of synthetic polymer fiber with, said upper surface having a minimum needlework of 2 million stitches per square meter, and B) a lower layer of cellular polyethylene having closed cells and a density between 25 and 35 kilograms per cubic meter and a thickness of at least 5 millimeters, said upper layer and said lower layer being hot welded together without adhesive.

2. Floor covering according to claim 1, wherein the lower layer made of cellular polyethylene has a thickness of 5.5 millimeters, and the upper surface layer a thickness of 6.0 millimeters.

3. Floor covering according to claim 1, wherein the lower layer made of cellular polyethylene has a density of about 30 kgs/m³.

4. Floor covering according to claim 1, wherein the lower layer made of cellular polyethylene is perforated.

5. Floor covering according to claim 4, wherein the diameter of each perforation is 4 to 5 millimeters and the distance between the perforations is 20 to 30 millimeters.

6. Floor covering according to claim 1 or 4, wherein the upper surface layer of fleece has needlework of 3 million stitches per m².

7. Floor covering according to claim 1, wherein the fibers in the upper layer are made of polypropylene.

* * * * *